(12) United States Patent
Bang et al.

(10) Patent No.: US 10,931,980 B2
(45) Date of Patent: Feb. 23, 2021

(54) METHOD AND APPARATUS FOR PROVIDING 360 DEGREE VIRTUAL REALITY BROADCASTING SERVICE

(71) Applicant: Electronics and Telecommunications Research Institute, Daejeon (KR)

(72) Inventors: Gun Bang, Daejeon (KR); Kug Jin Yun, Daejeon (KR); Youngsoo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 153 days.

(21) Appl. No.: 16/309,595

(22) PCT Filed: Jul. 19, 2017

(86) PCT No.: PCT/KR2017/007784
§ 371 (c)(1),
(2) Date: Dec. 13, 2018

(87) PCT Pub. No.: WO2018/016879
PCT Pub. Date: Jan. 25, 2018

(65) Prior Publication Data
US 2020/0275134 A1 Aug. 27, 2020

(30) Foreign Application Priority Data

Jul. 19, 2016 (KR) .................. 10-2016-0091584
Jul. 19, 2017 (KR) .................. 10-2017-0091491

(51) Int. Cl.
*H04N 21/218* (2011.01)
*H04N 21/63* (2011.01)
*H04N 21/2343* (2011.01)

(52) U.S. Cl.
CPC ............ *H04N 21/21805* (2013.01); *H04N 21/234327* (2013.01); *H04N 21/234345* (2013.01); *H04N 21/234363* (2013.01); *H04N 21/631* (2013.01)

(58) Field of Classification Search
CPC ..... H04N 21/21805; H04N 21/234327; H04N 21/234345; H04N 21/234363; H04N 21/631
(Continued)

(56) References Cited

U.S. PATENT DOCUMENTS 9,043,849 B2   5/2015   Yie et al.
9,232,257 B2   1/2016   Gautier et al.
(Continued)

FOREIGN PATENT DOCUMENTS

EP     2 153 645 A1    2/2010
KR   10-2008-0098328 A  11/2008
(Continued)

OTHER PUBLICATIONS

Favalli et al. "A Scalable Multiple Description Scheme for 3D Video Coding Based on the Interlayer Prediction Structure", Research Article, Dec. 11, 2009.*
(Continued)

*Primary Examiner* — James T Boylan
(74) *Attorney, Agent, or Firm* — NSIP Law

(57) ABSTRACT

An apparatus for providing a 360 degree virtual reality broadcasting service uses an image acquired through a 3D virtual reality (VR) camera to transmit a 360 degree full image stream having first resolution and transmits an image stream of a view of interest (VoI) region having second resolution different from the first resolution according to a
(Continued)

user selection mode and move information if the user selection mode and the movement information are received from a receiving apparatus.

17 Claims, 12 Drawing Sheets

(58) Field of Classification Search
USPC .......................................................... 348/42
See application file for complete search history.

(56) References Cited

U.S. PATENT DOCUMENTS

| | | | |
|---|---|---|---|
| 9,288,466 B2 | 3/2016 | Kim et al. | |
| 10,419,738 B1* | 9/2019 | Phillips | H04N 13/383 |
| 2007/0081586 A1 | 4/2007 | Raveendran et al. | |
| 2014/0002598 A1* | 1/2014 | Kim | H04N 21/816 |
| | | | 348/43 |
| 2015/0016504 A1* | 1/2015 | Auyeung | H04N 19/33 |
| | | | 375/240.02 |
| 2015/0089564 A1* | 3/2015 | Hong | H04N 13/194 |
| | | | 725/131 |
| 2016/0150212 A1* | 5/2016 | Moura | H04N 19/39 |
| | | | 375/240.02 |
| 2016/0191798 A1 | 6/2016 | Yoo et al. | |
| 2017/0118540 A1* | 4/2017 | Thomas | H04N 19/167 |
| 2018/0302556 A1* | 10/2018 | Baran | H04N 19/167 |
| 2020/0092571 A1* | 3/2020 | Tourapis | H04N 19/597 |

FOREIGN PATENT DOCUMENTS

| | | |
|---|---|---|
| KR | 10-2012-0088507 A | 8/2012 |
| KR | 10-2013-0024357 A | 3/2013 |
| KR | 10-2013-0058648 A | 6/2013 |
| KR | 10-2014-0002471 A | 1/2014 |
| KR | 10-2014-0112956 A | 9/2014 |
| KR | 10-2015-0029461 A | 3/2015 |
| KR | 10-2015-0047225 A | 5/2015 |
| KR | 10-2016-0079357 A | 7/2016 |

OTHER PUBLICATIONS

Polys, Nicholas F. et al., "Future Standards for Immersive VR: Report on the IEEE Virtual Reality 2007 Workshop", *IEEE Computer Graphics and Applications*, vol. 28, Issue 2, Mar./Apr. 2008, (pp. 94-99).

International Search Report dated Oct. 24, 2017 in corresponding International Patent Application No. PCT/KR2017/007784 (4 pages in English and 4 pages in Korean).

* cited by examiner

Omni-directional 3D VR encoder (30)

METHOD AND APPARATUS FOR PROVIDING 360 DEGREE VIRTUAL REALITY BROADCASTING SERVICE

CROSS REFERENCE TO RELATED APPLICATIONS

This application is a U.S. National Stage Application of International Application No. PCT/KR2017/007784, filed on Jul. 19, 2017, which claims the benefit under 35 U SC 119(a) and 365(b) of Korean Patent Application No. 10-2016-0091584, filed on Jul. 19, 2016, and Korean Patent Application No. 10-2017-0091491, filed on Jul. 19, 2017 in the Korean Intellectual Property Office.

TECHNICAL FIELD

The present invention relates to a method and an apparatus for providing a 360 degree virtual reality broadcasting service. More particularly, the present invention relates to a method and an apparatus for providing a 360 degree virtual reality broadcasting service having temporal scalability, spatial scalability, and 3D scalability by efficiently using a broadcast network and an Internet network while keeping the existing ultra high definition (UHD) broadcasting service.

BACKGROUND ART

With appearance of digital broadcasting, the existing broadcasting scheme for allowing a user to view a signal unilaterally sent from a broadcasting station is changed to a scheme for allowing a user to view only his/her desired content any time. In addition, by virtue of interlocking with the Internet network, a user may use a bi-directional broadcasting service capable of transmitting/receiving interactive data while viewing broadcasting. Recently, with development of a wideband transmission technology, a realistic broadcasting service capable of providing 4k or more high image quality realistic media to a viewer while overcoming a bandwidth limit.

Recently, as high resolution image services such as the digital broadcasting and the Internet has become popular, the UHD image is scheduled to be provided as a next generation broadcasting service. In addition, development for a new service capable of maximizing immersive effect and reality of users has been in progress. In the digital video broadcasting (DVB) which is the Europe broadcasting standard, requirements for providing a virtual reality (VR) broadcasting service and service scenarios related thereto have been under discussion from January, 2016. In the moving picture experts group (MPEG), standardizations for an omni-directional 360 degree VR image encoding technology have been in progress. Further, panorama broadcasting and omni-directional 360° broadcasting for providing a wider view angle have been under discussion even in the country.

However, a specific method for providing omni-directional a 360 degree VR broadcasting service as well as a UHD broadcasting service to viewers through a hybrid network has not yet been proposed.

DISCLOSURE

Technical Problem

The present invention has been made in an effort to provide a method and an apparatus for providing a 360 degree VR broadcasting service having advantages of allowing a service provider to efficiently provide the 360 degree VR broadcasting service having spatial, temporal, and 3D scalabilities through a hybrid network while keeping the existing UHD broadcasting service.

Technical Solution

An exemplary embodiment of the present invention provides a method for providing a 360 degree virtual reality (VR) broadcasting service through a hybrid network in a transmitting apparatus. The method for providing a 360 degree virtual reality (VR) broadcasting service may include: transmitting a 360 degree full image stream having first resolution using an image acquired through a 3D VR camera; receiving a user selection mode and movement information from a receiving apparatus; and transmitting an image stream of a view of interest (VoI) region having second resolution different from the first resolution depending on the user selection mode and the movement information.

The transmitting of the image stream of the VoI region may include transmitting an image stream of some region continued to the VoI region on left and right, respectively, of the VoI region together with the image stream of the VoI region.

The some region may be a region in which encoding is independently performed and is formed to be smaller than the VoI region The transmitting of the image stream of the some region together with the image stream of the VoI region may include: transmitting the image stream of the VoI region through a base layer; and transmitting the image stream of the some region through an enhancement layer The 360 degree full image stream may be transmitted through a broadcast network and the image stream of the VoI region may be transmitted through an Internet network.

The transmitting of the 360 degree full image stream may includes segmenting the 360 degree full image stream into a 360 degree full image stream of an odd frame and a 360 degree full image stream of an even frame to transmit the 360 degree full image stream.

The transmitting of the image stream of the VoI region may include segmenting the image stream of the VoI region into a VoI image stream of an odd frame and a VoI image stream of an even frame to transmit the image stream of the VoI region and one of the 360 degree full image stream of the odd frame and the 360 degree full image stream of the even frame may be transmitted through a broadcast network and the other of the 360 degree full image stream of the odd frame and the 360 degree full image stream of the even frame and the VoI image stream of the odd frame and the VoI image stream of the even frame may be transmitted through an Internet network.

The transmitting of the 360 degree full image stream may include transmitting a left image stream and a right image stream for the 360 degree full image stream, the transmitting of the image stream of the VoI region may include transmitting a left image stream and a right image stream for the image of the VoI region, and one of the left image stream and the right image stream for the 360 degree full image stream may be transmitted through a broadcast network and the other of the left image stream and the right image stream for the 360 degree full image stream and the left image stream and the right image stream for the image of the VoI region may be transmitted through an Internet network.

Another exemplary embodiment of the present invention provides an apparatus for providing a 360 degree virtual reality (VR) broadcasting service through a hybrid network. The apparatus for providing a 360 degree virtual reality (VR) broadcasting service may include: an omni-directional 3D VR acquisition apparatus acquiring a plurality of source inputs for the 360 degree VR broadcasting service based on an image acquired through a 3D VR camera; and a broadcasting server selecting at least one of the plurality of source inputs depending on user selection information and transmitting the selected source input through the hybrid network and providing the 360 degree VR broadcasting service using at least one of spatial scalability, temporal scalability, and 3D scalability.

The broadcasting server may select a 360 degree full image having first resolution and an image of a view of interest (VoI) region having second resolution higher than first resolution as a source input for the spatial scalability, and the image of the VoI region may extract the image of the VoI region depending on movement information of a user received from a receiving apparatus.

The broadcasting server may transmit an image of some region continued to the VoI region on left and right, respectively, of the VoI region together with an image of the VoI region and the some region may be a region in which encoding is independently performed The broadcasting server may transmit the image of the VoI region through a base layer and may transmit the image of the some region through an enhancement layer.

The broadcasting server may segment the 360 degree full image into an image of an odd frame and an image of an even frame and select the 360 degree full image of the odd frame and the 360 degree full image of the even frame for the temporal scalability.

The broadcasting server may segment the image of the VoI region into a VoI image of an odd frame and a VoI image of an even frame and select the 360 degree full image of the odd frame and the 360 degree full image of the even frame and the VoI image of the odd frame and the VoI image of the even frame as a source input for the temporal scalability, and one of the 360 degree full image of the odd frame and the 360 degree full image of the even frame may be transmitted through a broadcast network and the other of the 360 degree full image of the odd frame and the 360 degree full image of the even frame and the VoI image of the odd frame and the VoI image of the even frame may be transmitted through an Internet network.

The broadcasting server may select a left image and a right image for the 360 degree full image as the source input for the 3D scalability or select a left image and a right image for the 360 degree full image and a left image and a right image for the image of the VoI region as the source input and one of the left image and the right image for the 360 degree full image may be transmitted through a broadcast network and the other of the left image and the right image for the 360 degree full image and the left image and the right image for the image of the VoI region may be transmitted through an Internet network.

Yet another exemplary embodiment of the present invention provides a method for providing a 360 degree virtual reality broadcasting service in a receiving apparatus. The method for providing a 360 degree virtual reality broadcasting service may include: receiving a 360 degree full image stream having first resolution through a hybrid network; transmitting a user selection mode and movement information to a transmitting apparatus; receiving an image of a view of interest (VoI) region having second resolution higher than the first resolution depending on the user selection mode and the movement information from the transmitting apparatus through the hybrid network; and decoding a 360 degree full image stream having the first resolution and an image stream of the VoI region having the second resolution to provide a 360 degree virtual reality broadcasting service having the second resolution.

The receiving of the 360 degree full image stream may include receiving a 360 degree full image stream of an odd frame and a 360 degree full image stream of an even frame, the receiving of the image stream of the VoI region may include receiving the image stream of the VoI region into a VoI image stream of an odd frame and a VoI image stream of an even frame, and one of the 360 degree full image stream of the odd frame and the 360 degree full image stream of the even frame may be received through a broadcast network and the other of the 360 degree full image stream of the odd frame and the 360 degree full image stream of the even frame and the VoI image stream of the odd frame and the VoI image stream of the even frame may be received through an Internet network.

The method may further include: selectively receiving the 360 degree full image stream of the odd frame and the 360 degree full image stream of the even frame and the VoI image stream of the odd frame and the VoI image stream of the even frame to provide a 360 degree virtual reality broadcasting service of a frame rate in accordance with performance of the receiving apparatus.

The receiving of the 360 degree full image stream may include receiving a left image stream and a right image stream for the 360 degree full image stream, the receiving of the image stream of the VoI region may include receiving a left image stream and a right image stream for the image stream of the VoI region, and one of the left image stream and the right image stream for the 360 degree full image stream may be received through a broadcast network and the other of the left image stream and the right image stream for the 360 degree full image stream and the left image stream and the right image stream for the image of the VoI region may be received through an Internet network.

The method may further include: selectively receiving a left image stream and a right image stream for the 360 degree full image stream and a left image stream and a right image stream for the image stream of the VoI region to provide a 360 degree 3D virtual reality broadcasting service.

Advantageous Effects

According to an exemplary embodiment of the present invention, it is possible to apply for the development of the transmitting/receiving system for various realistic broadcasting services by suggesting the method for effectively providing a source input of a transmitting apparatus for providing an FHD 360 degree (omni-directional) VR broadcasting service, a 4K omni-directional VR broadcasting service, an FHD omni-directional 3D VR broadcasting service, and a 4K omni-directional 3D VR broadcasting service while providing a UHD broadcasting service to a viewer based on the existing digital broadcasting platform or ATSC 3.0 broadcasting platform.

MODE FOR INVENTION

Figure 1:
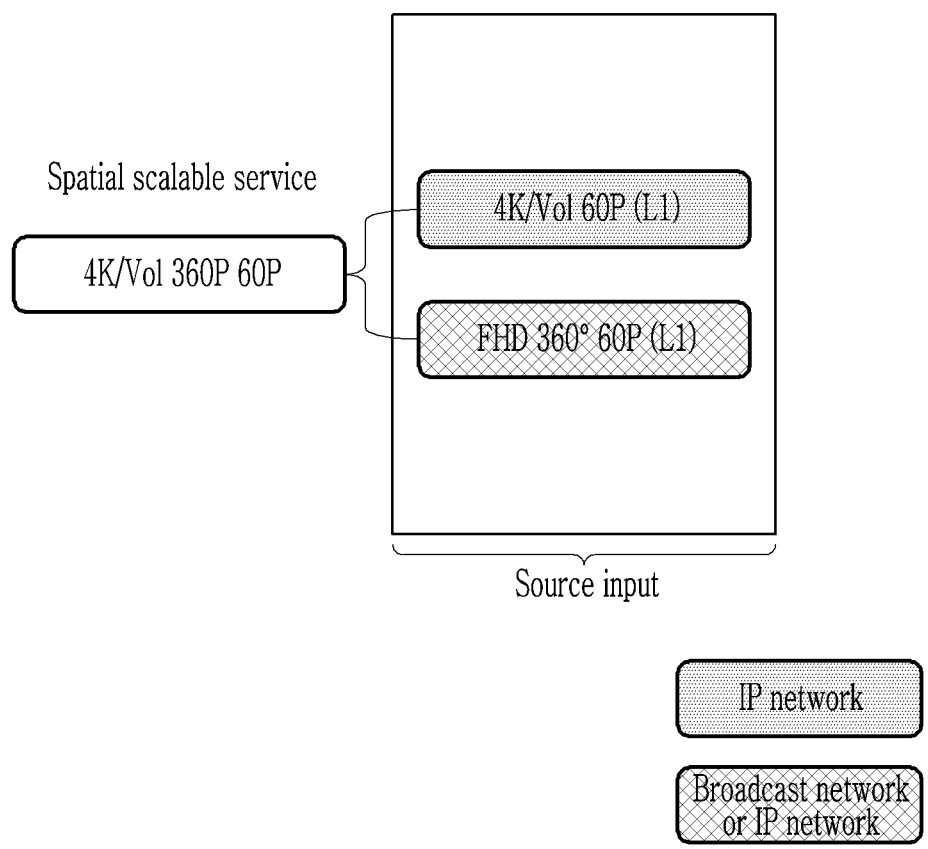
FIG. 1 is a diagram illustrating a concept of a 360 degree VR broadcasting service using spatial scalability according to an exemplary embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, the word "comprise" and variations such as "comprises" or "comprising", will be understood to imply the inclusion of stated elements but not the exclusion of any other elements.

Hereinafter, a method and an apparatus for providing a 360 degree virtual reality (VR) broadcasting service according to an exemplary embodiment of the present invention will be described in detail with reference to the accompanying drawings.

The method for providing a 360 degree VR broadcasting service using a hybrid network according to the exemplary embodiment of the present invention may consider spatial scalability, temporal scalability, and 3D scalability.

The spatial scalability provides a source input for optimal resolution to a terminal in accordance with the resolution of the terminal receiving a broadcasting service. For example, the spatial scalability can increase resolution to 4K resolution only in a region displayed on the screen while transmitting a 2K 360 degree image to selectively transmit 360 degree images for each region, thereby increasing the resolution of the 360 degree image for the region displayed on the screen.

The temporal scalability configures a source input of a transmitting end into an even frame/field and an odd frame/field to adjust a frame rate in accordance with performance of the terminal. For example, the terminal can selectively plays a 360 degree VR image at 60 frame per second (fps) and 120 fps by transmitting an even frame having a 60 fps and an odd frame having 60 fps.

The 3D scalability selectively uses the transmitted source input in accordance with 3D performance of the terminal to allow the terminal to play a 360 degree 3D image using 2D/3D conversion.

For the functions of the temporal, spatial, and 3D scalabilities, an image encoding method uses any of the existing H.264/advanced video coding (AVC), H.265/high efficiency video coding (HEVC), MV-HEVC, scalable HEVC (SHVC), and SVC, and the selected encoding method affects only the source input transmitted from only the transmitting end.

The concept has an advantage of easily starting a new 360 degree VR image service while keeping compatibility the existing terminal for a 2D source input used in the existing broadcast network.

Figure 3:
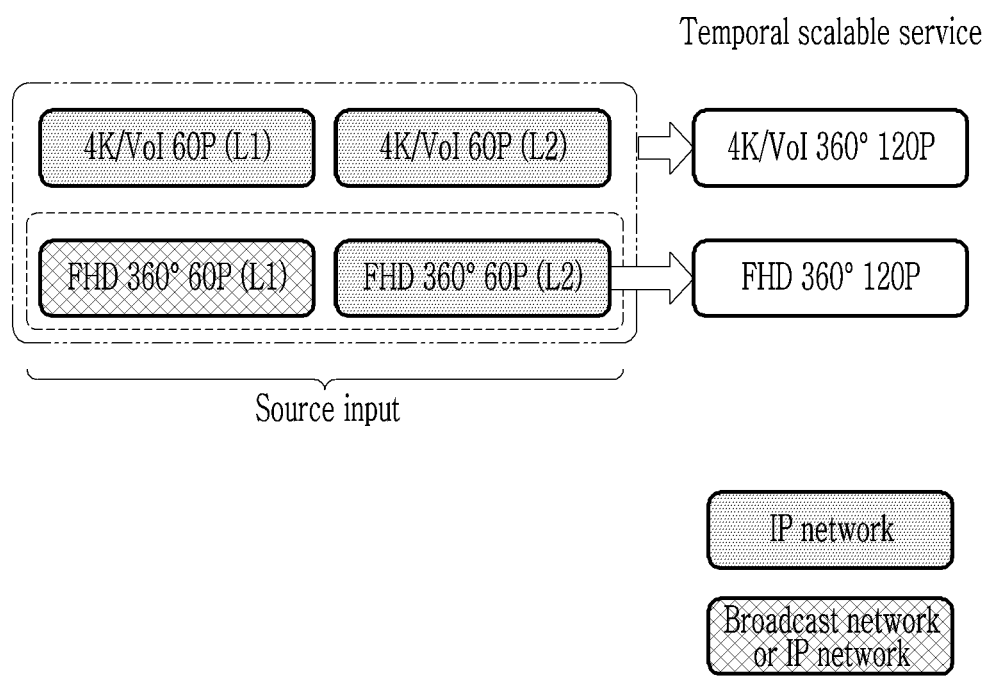
FIG. 3 is a diagram illustrating a concept of a 360 degree VR broadcasting service using temporal scalability according to an exemplary embodiment of the present invention.
Figure 4:
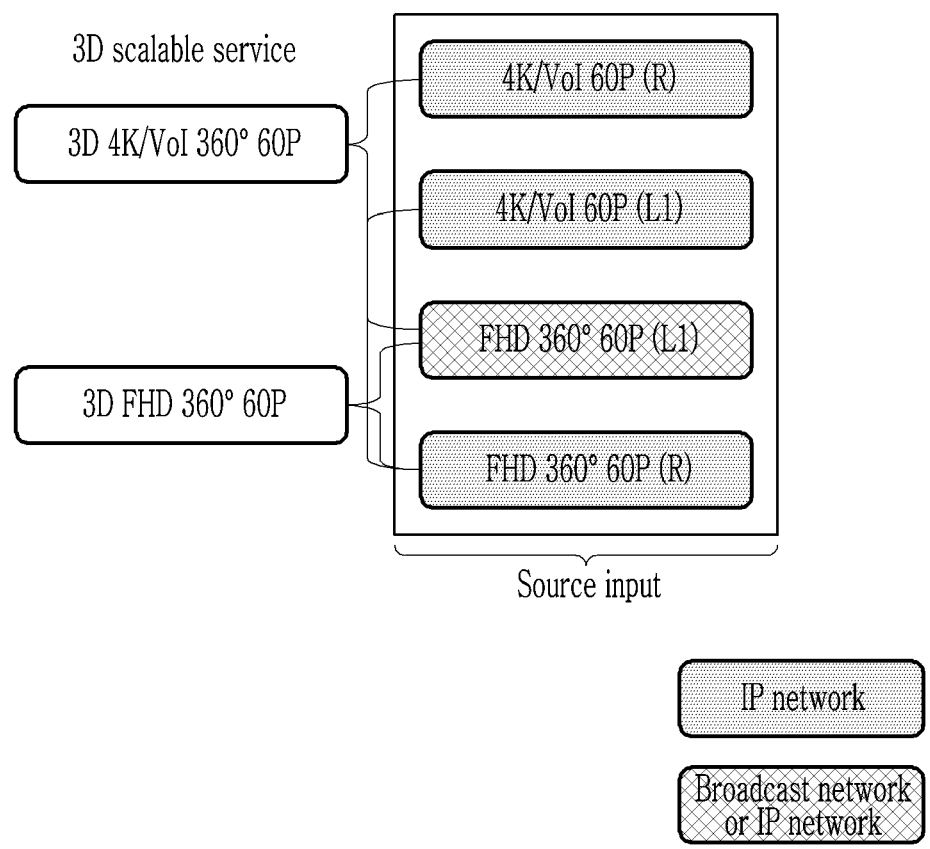
FIG. 4 is a diagram illustrating a concept of a 360 degree VR broadcasting service using 3D scalability according to an exemplary embodiment of the present invention.

In more detail, each broadcasting service may be configured by the spatial scalability, the temporal scalability, and the 3D scalability as illustrated in FIGS. 1, 3, and 4.

FIG. 1 is a diagram illustrating a concept of a 360 degree VR broadcasting service using spatial scalability according to an exemplary embodiment of the present invention.

Referring to FIG. 1, a full high definition (FHD) 360° 60P image (video) is transmitted through a broadcast network or an IP network. The 60P represents 60 fps. The FHD 360 degree 60P image may be applied only to a terminal having minimum FHD decoding capability and low resolution. At this time, if a terminal having more than 4K resolution and decoding capability exists, an FHD 360 degree 60P image and a 4K/view of interest (VoI) 60P image are used as a source input of a transmitting end. In this case, a terminal receives and decodes the FHD 360 degree 60P image and the 4K/view of interest (VoI) 60P image, thereby playing the 360 degree 60P image of the 4K resolution per viewpoint.

The 4K/VoI 60P image is transmitted through the IP network.

Here, the VoI means a part displayed on a screen in the 360 degree 60P image. That is, the VoI means a region shown by a head rotation when a user uses devices such as a head mounted display (HMD). Therefore, a 360° full image having high resolution is transmitted and a terminal need not decode the entire of the 360° full image. Accordingly, an image having high resolution is transmitted only to a VoI region and the terminal decodes only the image of the VoI region, such that complexity of the terminal can be greatly reduced. At this time, the FHD 360 degree 60P image may be transmitted to a base layer and the 4K/VoI 60P image may be transmitted to an enhancement layer. By doing so, all the 4K 360 degree 60P images are not transmitted to the enhancement layer, thereby reducing a data amount of an image. Further, the SHVC may be used for the enhancement layer, and thus the FHD 360 degree 60P image can be transmitted to the base layer and only the residual image can be transmitted to the enhancement layer, thereby reducing the data amount of the image.

Further, when only image of the VoI region is transmitted depending on the user interaction, a delay may occur during a transmission. According to the exemplary embodiment of the present invention, the delay may be minimized by transmitting an image having a larger region on the left and right than the VoI region.

Figure 2:
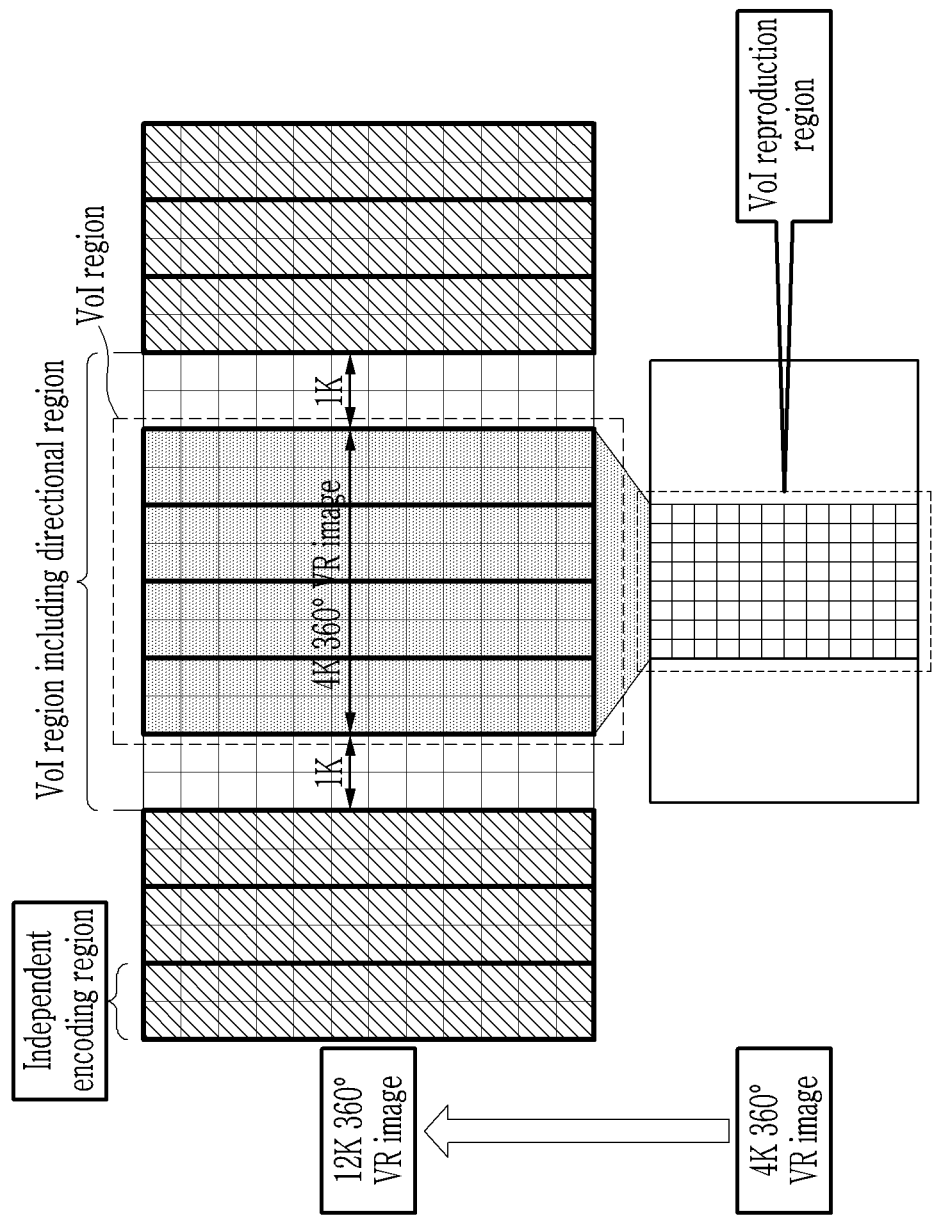
FIG. 2 is a diagram illustrating an example of a method for transmitting an image of a VoI region according to an exemplary embodiment of the present invention.

FIG. 2 is a diagram illustrating an example of a method for transmitting an image of a VoI region according to an exemplary embodiment of the present invention.

Referring to FIG. 2, an apparatus for providing a 360 degree VR broadcasting service may transmit a 360 degree (omni-directional) VR full image to the base layer for a spatial scalable service and transmit the VR image of the selected VoI region to the enhancement layer according to the user interaction. For example, the 360 degree VR full image is transmitted to the base layer as an HD or 4K image and the 4K 360 degree VR image of the VoI region selected from a 12K 360 degree VR image is transmitted to the enhancement layer depending on the user interaction. At this time, an image (for example, 1K image) of an additional region on the left and right of the VoI region may be transmitted to the enhancement layer in consideration of the transmission delay. For this purpose, the 12K 360 degree VR image consists of an image of a smaller region than the VoI region so that it can be decoded only by an image of a partial region. Herein, the region is called an independent encoding region. The independent encoding regions are collected to configure the VoI region and an extra image of the independent encoding region is additionally transmitted to the left and right of the VoI region in consideration of the transmission delay. The region in which the extra independent encoding region is added to the left and right of the VoI region is called a VoI region including a directional region.

Then, the terminal plays an image of a region of a viewpoint that a user sees, that is, a VoI reproduction region.

FIG. 3 is a diagram illustrating a concept of a 360 degree VR broadcasting service using temporal scalability according to an exemplary embodiment of the present invention.

Referring to FIG. 3, if the FHD 360° 60P service is provided through the existing broadcast network or the IP network, two services may be provided by the temporal scalability.

First, the apparatus according to the exemplary embodiment of the present invention may increase only temporal resolution from 60P to 120P without increasing the spatial resolution. The terminal capable of decoding 120P may receive an FHD 360 degree 60P odd frame/field [FHD 360 degree 60P L2] image together with an FHD 360 degree 60P even frame/field [FHD 360 degree 60P L1] image to play an FHD 360 degree 120P image.

Second, the apparatus according to the exemplary embodiment of the present invention may provide a service capable of performing the temporal scalability simultaneously increasing the spatial resolution. At this time, the FHD 360 degree 60P L1 image and the FHD 360 degree 60P L2 image are transmitted to the base layer and the 4K/VoI 60P L1 image and the 4K/VoI 60P L2 image for the spatial scalability are transmitted to the enhancement layer, such that the terminal may receive the FHD 360 degree 60P L1 image, the FHD 360 degree 60P L2 image, the 4K/VoI 60P L1 odd frame image, and the 4K/VoI 60P L2 even frame image to provide the 4K/VoI 360 degree 120P image that undergoes the temporal and spatial scalability.

FIG. 4 is a diagram illustrating a concept of a 360 degree VR broadcasting service using 3D scalability according to an exemplary embodiment of the present invention.

Referring to FIG. 4, if the existing FHD 360 degree 60P L1 image is transmitted through the broadcast network or the IP network, the existing terminal can play the FHD 360 degree VR image. In addition, two kinds of 3D scalable services are possible.

First, the apparatus for providing a 360 degree VR broadcasting service according to the exemplary embodiment of the present invention transmits an FHD 360 degree left image [FHD 360 degree 60P L1] and an FHD 360 degree right image [FHD 360 degree 60P (R)], such that the terminal can play a 3D FHD 360 degree 60P image. That is, an FHD 360 degree left image [FHD 360 degree 60P L1] is transmitted through the broadcast network or the IP network and an FHD 360 degree right image [FHD 360 degree 60P (R)] is transmitted through the IP network, such that the terminal may provide a 3D FHD 360 degree 60P image service.

Second, the apparatus for providing a 360 degree VR broadcasting service according to the exemplary embodiment of the present invention transmits an FHD 360 degree left image [FHD 360 degree 60P L1] and an FHD 360 degree right image [FHD 360 degree 60P (R)] to the base layer and transmits left/right viewpoint images [4K/VoI 60P L1, 4K/VoI 60P (R)] for the spatial scalability to the enhancement layer, such that the terminal can provide the 3D 4K/VoI 360 degree 60P image service. The left/right viewpoint images [4K/VoI 60P L1, 4K/VoI 60P (R)] for the spatial scalability are transmitted through the IP network.

Recently, the broadcasting system is being developed to a technology that can include various digital broadcasting service platforms, such as terrestrial/cable/IPTV, as they are. The advanced television systems committee (ATSC) 3.0 of North America which is the latest broadcasting standard defines a broadcasting standard based on a hybrid network considering the existing broadcast network and Internet network together. More specifically, one service may be provided through a hybrid network (broadcast network and Internet network) in which a broadcasting channel and an IP channel of a physical layer pipe (PLP) are variously combined.

Figure 5:
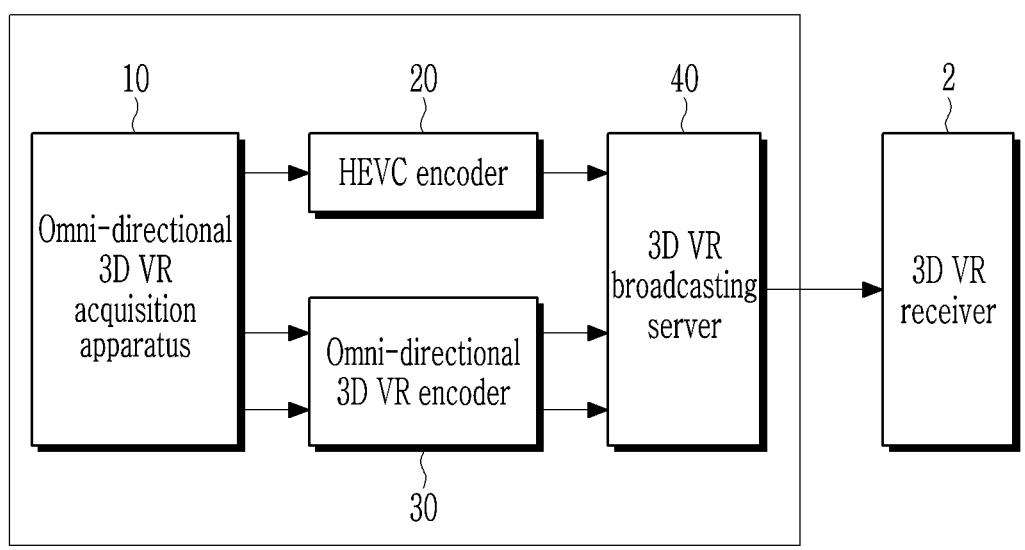
FIG. 5 is a schematic diagram of a broadcasting system for providing a 360 degree VR broadcasting service according to an exemplary embodiment of the present invention.

Therefore, the 360 degree VR broadcasting service using the spatial scalability, the temporal scalability, and the 3D scalability according to the exemplary embodiment of the present invention is transmitted through the hybrid network using the broadcast network and the IP network together, which can be implemented as illustrated in FIG. 5.

Figure 6:
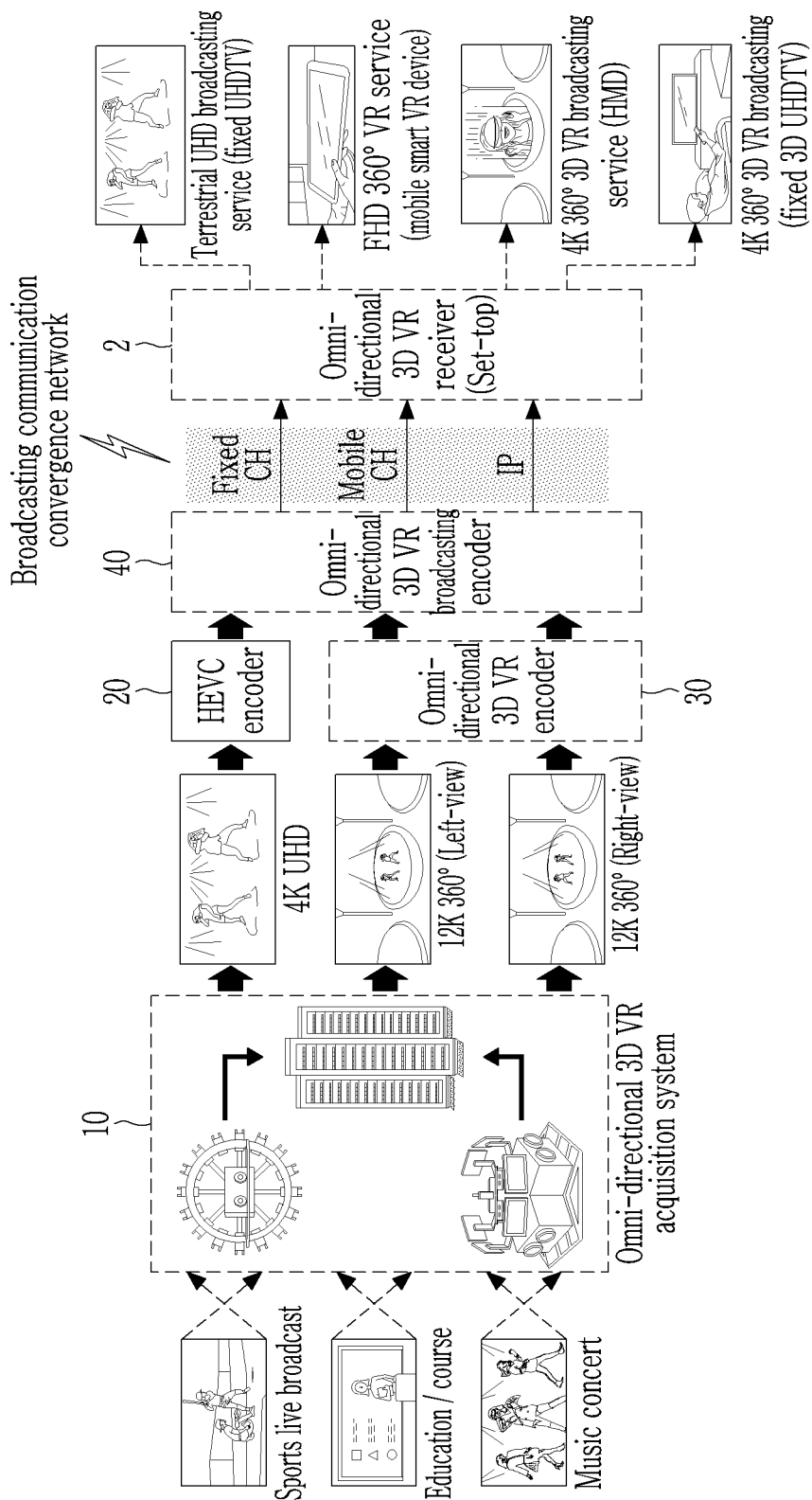
FIG. 6 is a diagram illustrating an example of providing a broadcasting service of the broadcasting system illustrated in illustrated in FIG. 5.

FIG. 5 is a schematic diagram of a broadcasting system providing a 360 degree VR broadcasting service according to an exemplary embodiment of the present invention, in which the broadcasting system interlocking the 360 degree VR broadcasting service according to the exemplary embodiment of the present invention with the existing 2D UHD broadcasting service through the hybrid network based broadcasting platform and providing the interlocked broadcasting service is illustrated. FIG. 6 is a diagram illustrating an example of providing a broadcasting service of the broadcasting system illustrated in illustrated in FIG. 5.

Referring to FIG. 5, a broadcasting system 1 corresponding to the apparatus for providing a 360 degree VR broadcasting service includes an omni-directional 3D VR acquisition apparatus 10, a high efficiency video codec (HEVC) encoder 20, an omni-directional 3D VR encoder 30, and 3D VR broadcasting server 40, and a 3D VR receiving apparatus 2 receives a broadcasting service provided from the broadcasting system 1. The 3D VR receiving apparatus 2 may be, for example, a terminal, a TV, or the like.

According to the exemplary embodiment of the present invention, various broadcasting services may be provided through a hybrid network-based broadcasting platform. For example, the UHD broadcasting service, the FHD 360° VR broadcasting service, the 4K 360 degree VR broadcasting service, the 360 degree omni-directional 3D VR broadcasting service, or the like may be provided based on the source inputs described above.

The broadcasting platform may be various digital broadcasting services platforms such as terrestrial/cable/IPTV (Internet protocol TV), and may include the ATSC 3.0-based service platform currently established as a standard. The hybrid network is configured by combining various channels or the broadcasting channel and the IP channel of the physical layer pipe (PLP).

The omni-directional 3D VR acquisition apparatus 10 outputs an image data based on an image acquired by a 3D VR camera supporting predetermined resolution (e.g., 4K resolution). The omni-directional 3D VR acquisition apparatus 10 may output, for example, an UHD image data, a 360 degree VR left image data, and a 360 degree VR right image data. An image photographed by one camera may be used as the UHD image data as it is or an image of some region in the 360 degree VR may be applied to the UHD image data.

The HEVC encoder 20 encodes the UHD image data. The UHD image data may be applied to the ATSC3.0 broadcasting platform as it is and provide backward compatibility. Instead of the HEVC encoder 20, an encoder based on another encoding type may be used.

The omni-directional 3D VR encoder 30 encodes the 360° VR left image data and the 360 degree VR right image data.

Figure 7:
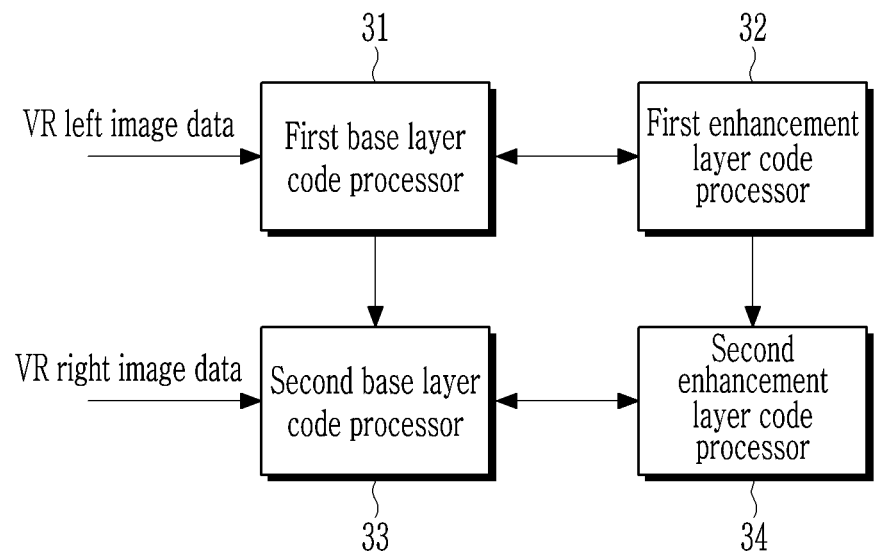
FIG. 7 is a diagram illustrating a structure of an omni-directional 3D VR encoder according to an exemplary embodiment of the present invention.
Figure 8:
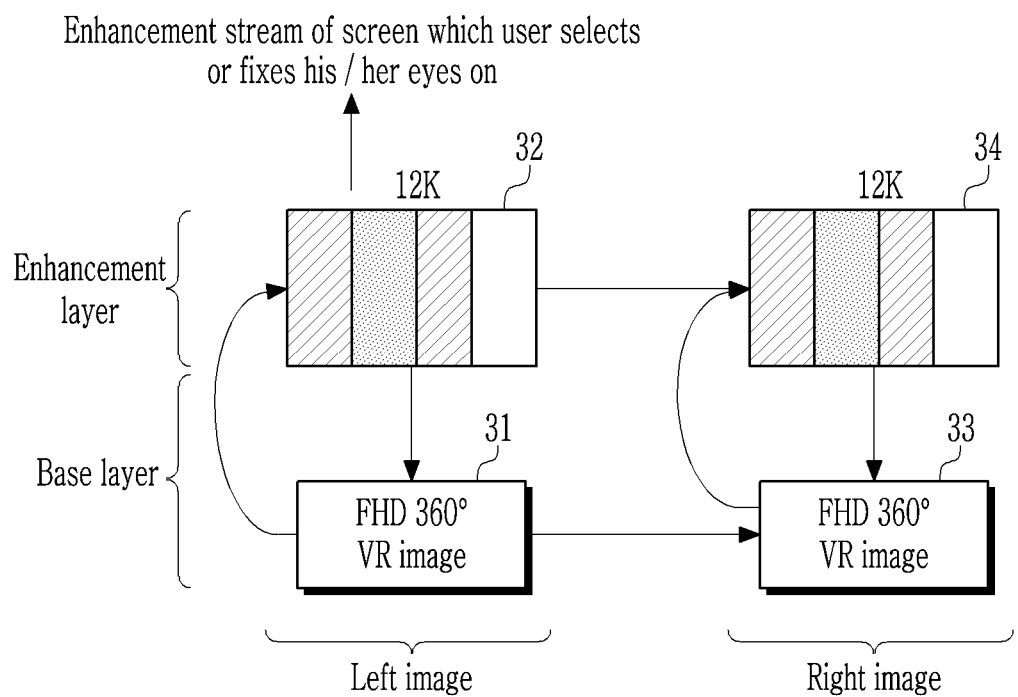
FIG. 8 is a diagram illustrating an operation of processing the omni-directional 3D VR encoder according to the exemplary embodiment of the present invention.

FIG. 7 is a diagram illustrating a structure of an omni-directional 3D VR encoder according to an exemplary embodiment of the present invention and FIG. 8 is a diagram illustrating an operation of processing the omni-directional 3D VR encoder according to the exemplary embodiment of the present invention.

As illustrated in FIG. 7, the omni-directional 3D VR encoder 30 according to the exemplary embodiment of the present invention includes a first base layer code processor 31, a first enhancement layer code processor 32, a second base layer code processor 33, and a second enhancement layer code processor 34.

The omni-directional 3D VR encoder 30 having the above structure encodes the 360 degree VR left image data and the 360 degree VR right image data based on the HEVC to output a stream of the base layer and a stream of the enhancement layer. The stream of the base layer consists of the FHD omni-directional 360° image stream, and the stream of the enhancement layer includes an enhancement stream for providing high-resolution (for example, high resolution equal to or greater than 4K) image quality for a user selection or the VoI region.

As illustrated in FIG. 8, the first base layer code processor 31 of the omni-directional 3D VR encoder 30 encodes the input 360 degree VR left image data with the HEVC to form the stream of the base layer of the left image and the first enhancement layer code processor 32 encodes the enhancement stream by referring to information on the base layer output from the first base layer code processor 31 for each VoI to form the stream of the enhancement layer of the left image. At this time, a VoI-based enhancement stream that a user selects has a minimum 4K resolution for each VoI. Therefore, the FHD omni-directional left image stream and a left image enhancement layer stream 1-N for each VoI are output.

In addition, to provide the omni-directional 3D VR service, the second base layer code processor 33 encodes the input 360° VR right image data by referring to the 360 degree VR left image data to form the stream of the base layer of the right image. The second enhancement layer code processor 34 encodes the enhancement stream by referring to the information on the enhancement layer of the left image provided from the first enhancement layer code processor 32 as well as the information on the base layer output from the second base layer code processor 33 to form the stream of the enhancement layer of the right image. Therefore, the FHD omni-directional right image stream and the right image enhancement layer stream 1-N for each VoI are output.

The omni-directional 3D VR encoder 30 operated as described above provides the backward compatibility with the existing FHD 360 degree VR device.

Meanwhile, the 3D VR broadcasting server 40 provides the broadcasting service based on streams provided from the HEVC encoder 20 and the omni-directional 3D VR encoder 30. The 3D VR broadcasting server 40 selects and transmits a source image and a channel to be transmitted in accordance with the broadcasting service to be provided to the 3D VR receiving apparatus 2 among the streams provided from the HEVC encoder 20 and the omni-directional 3D VR encoder 30. For example, if the 3D VR broadcasting server 40 transmits source image streams provided from the HEVC encoder 20 and the omni-directional 3D VR encoder 30 together with the existing 2D UHD broadcasting, as described with reference to FIGS. 1, 3, and 4, it may provide the broadcasting service that undergoes the spatial scalability, the temporal scalability, and the 3D scalability.

In the 3D VR receiving apparatus 2, various broadcasting services can be played using the source image streams transmitted from the 3D VR broadcasting server 40 in accordance with the capability of the 3D VR receiving apparatus 2.

Figure 9:
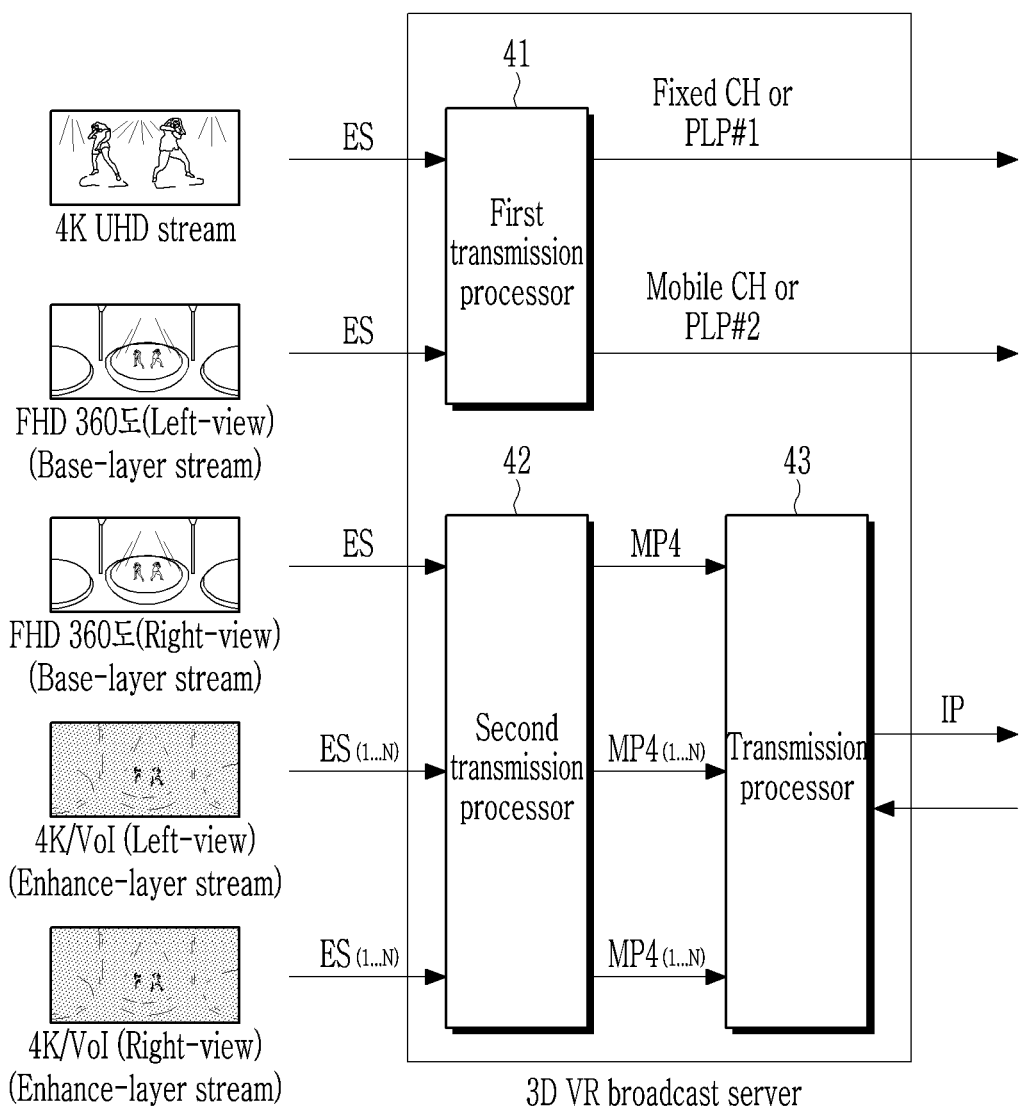
FIG. 9 is a diagram illustrating a structure of a 3D VR broadcasting server according to an exemplary embodiment of the present invention.

FIG. 9 is a diagram illustrating a structure of a 3D VR broadcasting server according to an exemplary embodiment of the present invention.

Referring to FIG. 9, the 3D VR broadcasting server 40 according to the exemplary embodiment of the present invention includes a first transmission processor 41, a second transmission processor 42, and a transmission server 43.

The 3D VR broadcasting server according to the exemplary embodiment of the present invention provides the omni-directional 3D VR broadcasting service based on the broadcasting platform (e.g., ATSC3.0 broadcasting platform).

For this purpose, the first transmission processor 41 multiplexes the encoded UHD image data output from the HEVC encoder 20, that is, the UHD stream (4K UHD stream) and the FHD 360 degree left image stream output from the omni-directional 3D VR encoder 30, respectively, and transmits the multiplexed UHD stream and FHD 360 degree left image stream to the channel providing the broadcasting service. Specifically, the first transmission processor 41 multiplexes the UHD stream with the existing real-time object delivery over unidirectional transport (ROUTE) or a MPEG media transport protocol (MMTP) to generate a transmission stream and transmits the multiplexed UHD stream through the broadcast network, for example, the channel or the physical layer pipes (PLP) for providing a UHD TV broadcasting service. In addition, the first transmission processor 41 multiplexes the FHD 360 degree left image stream with the ROUTE or the MMT like the UHD stream to generate the transmission stream and transmits the multiplexed FHD 360 degree left image stream to the channel or the mobile PLP for the UHD TV broadcasting service. In this way, the FHD 360 degree image stream is additionally transmitted through the broadcast network, such that a viewer may receive VR services from various smart mobile devices as well as the UHD broadcasting service. In addition, the multiplexed transmission stream transmitted to the PLP includes media presentation description (MPD) path information that describes information on the 360 degree right image stream transmitted to the IP network and the information on left/right image enhancement layer streams for each Vol.

The second transmission processor 42 processes the FHD 360 degree right image stream, the left image enhancement layer streams for each Vol, and the right image enhancement layer streams for each Vol, which are provided from the omni-directional 3D VR encoder 30, as the stream to be transmitted through the IP network. In detail, the second transmission processor 42 processes the FHD 360 degree right image stream as predetermined file formats [for example, ISO based media file format (ISOBMFF)] or a transport stream (TS) and transmits the processed FHD 360 degree right image stream to the transmission server 43.

The transmission server 43 transmits the stream provided from the second transmission processor 42 through the IP network. When a viewer wants to receive the FHD 360 degree 3D VR broadcasting service, the transmission server 43 segments an FHD 360 degree right image file into a plurality of segments according to an MPEG-dynamic adaptive streaming over HTTP (MPEG-DASH) and transmits the segmented FHD 360 degree right image file through the IP network. The transmission server 43 may also be called the DASH server.

Meanwhile, the left/right image enhancement layer streams for each Vol include information for providing high-resolution image quality for a viewer selection or the Vol, and the second transmission processor 42 converts the left/right image enhancement layer streams for each Vol into a predetermined format file (for example, ISOBMFF) or a TS file depending on the number of Vols and stores the predetermined format file or the TS file into the transmission server 43.

When the transmission server 43 wants the omni-directional 3D VR broadcasting service, it transmits all the FHD omni-directional VR right image streams and the left/right image enhancement layer streams for each Vol through the IP network.

Therefore, as a viewer receives the left/right image enhancement layer streams for each Vol for the screen of the Vol region which he/she selects or fixes his/her eyes on through the IP network while receiving the omni-directional VR broadcasting service of the FHD image quality based on the FHD 360 degree image transmitted through the broadcast network, he/she receives the 360 degree VR broadcasting service of the 4K high image quality.

In addition, when a viewer wants the 360 degree 3D VR broadcasting service of the 4K high image quality for the Vol, the transmission server 43 transmits all of the FHD 360 degree VR right image streams and the left/right image enhancement layer streams for each Vol through the IP network according to a viewer request. In this way, the sensor effect media capable of maximizing immersive effect and reality of a viewer are provided by transmitting the corresponding stream through the IP network according to the viewer request simultaneously with providing the UHD and FHD 360 degree images through the broadcast network. Further, the transmission server 43 can provide the backward compatibility with various types of typical terminals while keeping the broadcasting platforms such as the ATSC 3.0 as they are and provide the FHD or 4K 360 degree VR broadcasting service and the FHD or 4K 360 degree 3D VR broadcasting service.

Next, a structure of a receiving apparatus will be described.

Figure 10:
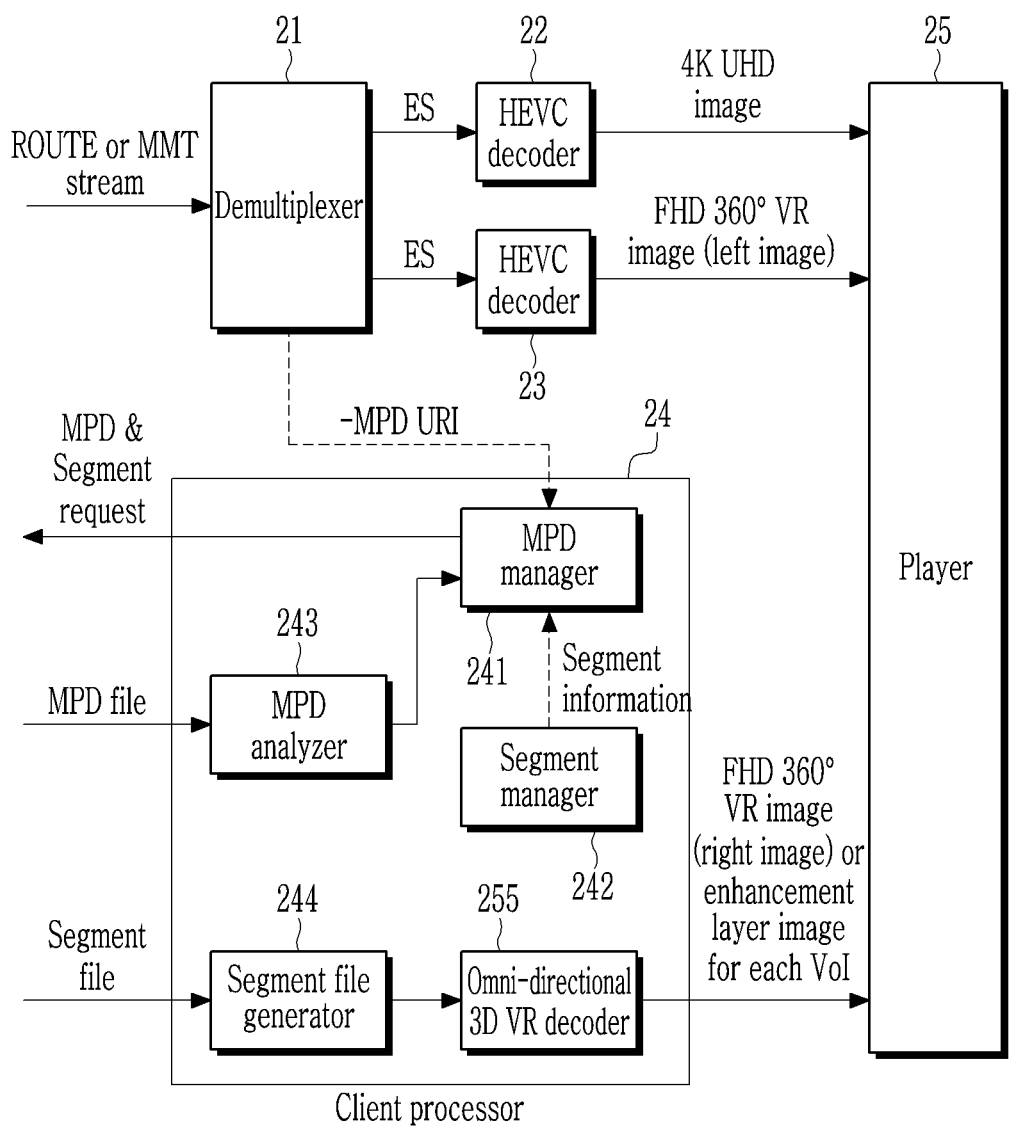
FIG. 10 is a diagram illustrating a structure of an omni-directional 3D VR receiving apparatus according to an exemplary embodiment of the present invention.

FIG. 10 is a diagram illustrating a structure of an omni-directional 3D VR receiving apparatus according to an exemplary embodiment of the present invention.

Referring to FIG. 10, the omni-directional 3D VR receiving apparatus 2 according to the exemplary embodiment of the present invention includes a demultiplexer 21, first and second HEVC decoders 22 and 23, and a client processor 24, and a player 25.

The demultiplexer 21 demultiplexes the stream received through the channel or the PLP for providing the UHD TV broadcasting service.

Specifically, demultiplexing (e.g., ROUTE or MMT-based demultiplexing) is performed on the UHD stream and the FHD 360 degree left image stream that are transmitted from the broadcasting system 1.

The first HEVC decoder 22 decodes the stream output from the demultiplexer 21 to output the UHD image. The second HEVC decoder 23 decodes the stream output from the demultiplexer 21 to output the FHD 360 degree VR left image.

The client processor 24 processes the stream and the transmission file that are received through the IP network to output the FHD 360 degree right image and the left/right image enhancement layer images for each Vol.

For this purpose, as illustrated in FIG. 10, the client processor 24 includes an MPD manager 241, a segment manager 242, an MPD analyzer 243, a segment file parser 244, and an omni-directional 3D VR decoder 245.

The MPD manager 241 serves to request an initial segment file and periodically update/manage the MPD based on the path information acquired from the MPD URI transmitted to the broadcast network. The path information is received from the demultiplexer 21. Further, the MPD manager 241 serves to request the segment file corresponding to the FHD 360 degree right image stream or the left/right image enhancement layer streams for each Vol depending on the user interaction based on the information received from the segment manager 242.

The segment manger 242 provides the segment file information that may be received under the current IP network condition to the MPD manager 241 and provides information for switching segment files for providing a stable service according to a network situation. In addition, the segment manager 242 provides the segment file information corresponding to the FHD 360 degree right image stream or the left/right image enhancement layer streams for each Vol to the MPD manager 241 depending on the user interaction (e.g., depending on user selection mode).

The MPD analyzer 243 receives the MPD file transmitted from the broadcasting system 1 according to, for example, the MPEG-DASH standard, confirms validity of the received MPD file, and acquires and analyzes element and attribute information of each media described in the MPD.

The segment file parser 244 analyzes the transmission files transmitted through the IP network, that is, the segment files transmitted in a segment unit and transmits the corresponding encoding stream to the omni-directional 3D VR decoder 245.

The omni-directional 3D VR decoder 245 decodes the stream transmitted from the segment file parser 244, that is, decodes the FHD 360 degree right image stream or the left/right image enhancement layer streams for each VoI to output the FHD 360 degree right image and the left/right image enhancement layer images for each VoI.

Meanwhile, the player 25 plays the FHD/4K 360 degree VR image or the FHD/4K 360 degree 3D VR image as well as the 4K UHD image, based on the UHD image and the FHD omni-directional VR left image that are provided the first and second HEVC decoders 22 and 23, respectively, and the FHD 360 degree right image and the left/right image enhancement layer images for each VoI that are provided from the client processor 24. At this time, when various VR devices and mobile devices are connected to the omni-directional 3D VR receiving apparatus 2, the corresponding receiving apparatus 2 serves as a kind of server and various VR and mobile devices serve as a kind of display.

The omni-directional 3D VR receiving apparatus 2 having the above structure may receive the UHD image stream and the FHD 360 degree VR left image stream, in which the streams received through the IP network may be changed depending on the user selection mode. The user selection mode includes the 4K omni-directional VR mode, the FHD omni-directional 3D VR mode, and the 4K omni-directional 3D VR mode, in which the streams received in each user selection mode are as follows.

4K Omni-Direction VR Mode

The omni-directional 3D VR receiving apparatus 2 requests and receives the left image enhancement layer streams (segment files) for each VoI to the 3D VR broadcasting server 40 of the broadcasting system 1.

FHD Omni-Directional 3D VR Mode

The omni-directional 3D VR receiving apparatus 2 requests and receives the FHD 360 degree VR stream (right image segment file) to the 3D VR broadcasting server 40 of the broadcasting system 1.

4K Omni-Directional 3D VR Mode

The omni-directional 3D VR receiving apparatus 2 requests and receives the FHD 360 degree VR stream (right image segment file) and the left/right image enhancement layer streams (segment files) for each VoI to the 3D VR broadcasting server 40 of the broadcasting system 1.

Figure 11:
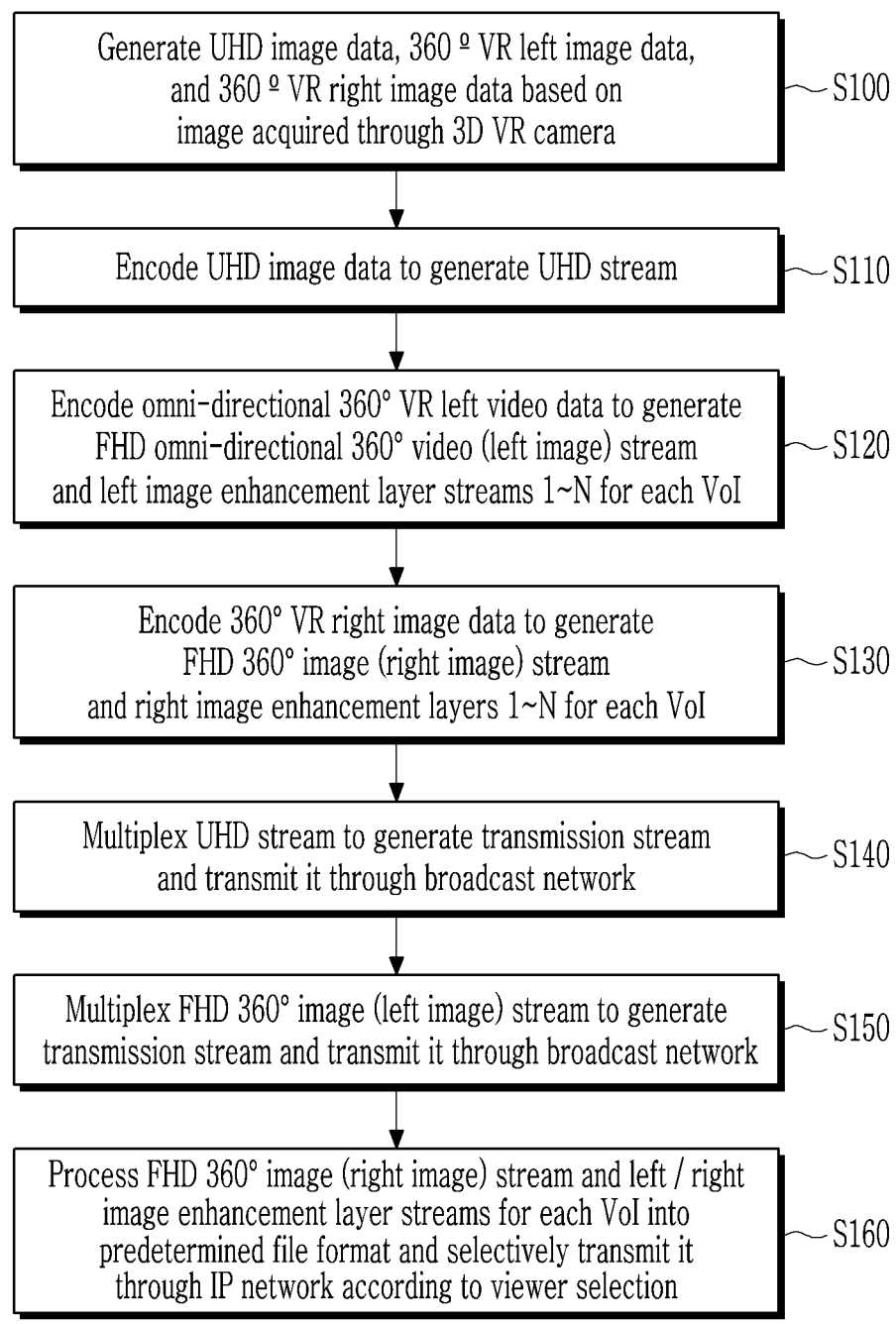
FIG. 11 is a flow chart describing an example of a method for providing a broadcasting service in a broadcasting system according to an exemplary embodiment of the present invention.

FIG. 11 is a flow chart describing an example of a method for providing a broadcasting service in a broadcasting system according to an exemplary embodiment of the present invention.

Referring to FIG. 11, the broadcasting system 1 generates the UHD image data, the 360 degree VR left image data, and the 360 degree VR right image data based on the image acquired through the 3D VR camera (S100).

The UHD stream is generated by encoding the UHD image data (S110), and the FHD 360 degree left image stream (called left image base layer stream) and the left image enhancement layer streams 1-N for each VoI are generated by encoding the 360 degree VR left image data (S120). The FHD 360 degree right image stream (called right image base layer stream) and the right image enhancement layer streams 1-N for each VoI are generated by encoding the 360 degree VR right image data (S130).

Next, the broadcasting system 1 multiplexes the UHD stream to generate the transmission stream and multiplexes the FHD 360 degree image (for example, left image) stream to generate the transmission stream. Further, the generated transmission stream is transmitted through the broadcast network (S140 and S150).

Meanwhile, the broadcasting system 1 processes the FHD 360 degree right image stream into a predetermined file format and segments the plurality of segments to generate the transmission stream. The left/right image enhancement layer streams for each VoI including the information for providing the high-resolution image quality for the viewer selection or the VoI region are processed in the predetermined format and are segmented into the plurality of segments to generate the transmission stream. The FHD 360 degree right image stream and the left/right image enhancement layer streams for each VoI are selectively transmitted depending on the viewer selection (S160).

For example, when the user selection mode is the 4K omni-directional 3D VR mode, that is, wants the omni-directional 3D VR broadcasting service of the 4K high image quality, the broadcasting system 1 transmits all of the FHD 360 degree VR right image stream and the left/right image enhancement layer streams for each VoI. Further, when the user selection mode is the FHD omni-directional 3D VR mode, the FHD 360 degree VR right image stream is transmitted through the IP network. Further, when the user selection mode is the 4K omni-directional VR mode, the left image enhancement layer streams for each VoI are transmitted through the IP network.

By doing so, according to the exemplary embodiment of the present invention, the spatial, temporal, and 3D scalable services may be provided, and in the omni-directional 3D VR receiver 2, various broadcasting services may be played using the source image transmitted from the broadcasting system 1.

Figure 12:
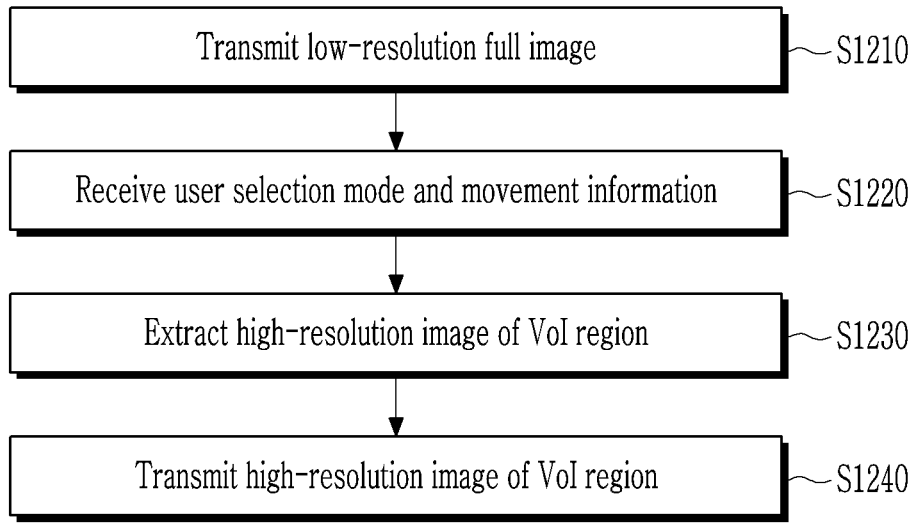
FIG. 12 is a flow chart describing a method for transmitting a high resolution image of a VoI region in a broadcasting system according to an exemplary embodiment of the present invention.

FIG. 12 is a flow chart describing a method for transmitting a high resolution image of a VoI region in a broadcasting system according to an exemplary embodiment of the present invention.

Referring to FIG. 12, the omni-directional 3D VR broadcasting server 40 of the broadcasting system 1 transmits the low-resolution 360 degree full image stream (S1210).

Next, when receiving movement information such as a head motion of a user and the user selection mode from a receiving apparatus 520 (S1220), the omni-directional 3D VR broadcasting server 40 may use the user selection mode and the movement information to extract the image stream of the VoI region having high resolution (S1230) and then transmit the image stream of the VoI region through the IP network (S1240).

The omni-directional 3D VR broadcasting server 40 may transmit the image stream having the larger region on the left and right than the VoI region as described with reference to FIG. 2, process the image stream of the VoI region and transmit the processed image stream to the base layer, and process the image stream of an independent encoding region added to the left and right of the VoI region and transmit the processed image stream to the enhancement layer.

By doing so, the terminal first receives and plays the low-resolution 360 degree image of the base layer and receives the image having high resolution of the VoI region through the enhancement layer depending on the movement information of the terminal, thereby playing the image of the VoI region with high resolution. At this time, if a user turns his/her head to see an image existing in other regions, he/she sees the image of the base layer, and the image having high resolution of the corresponding region is again received based on the movement information and thus the terminal can immediately play the image of the VoI region with high resolution.

Figure 13:
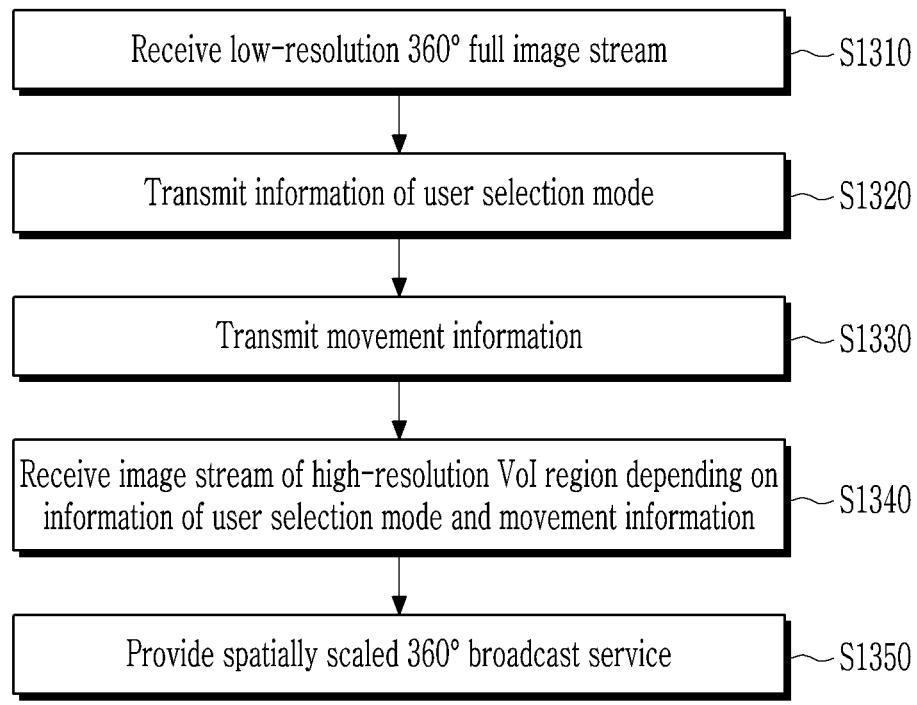
FIG. 13 is a flow chart describing an example of a method for providing a 360 degree broadcasting service in an omni-directional 3D VR receiver according to an exemplary embodiment of the present invention.

FIG. 13 is a flow chart describing an example of a method for providing a 360 degree broadcasting service in an omni-directional 3D VR receiver according to an exemplary embodiment of the present invention.

Referring to FIG. 13, the omni-directional 3D VR receiver 2 receives a low-resolution 360 degree full image stream (S1310).

The omni-directional 3D VR receiver 2 transmits the information of the user selection mode to the omni-directional 3D VR broadcasting server 40 (S1320). Further, the omni-directional 3D VR receiver 2 detects the movement information of the user and transmits the movement information of the user to the omni-directional 3D VR broadcasting server 40 (S1330).

When receiving the information of the user selection mode and the image stream of the VoI region having high resolution depending on the movement information from the omni-directional 3D VR broadcasting server 40 (S1340), the omni-directional 3D VR receiver 2 decodes the low-resolution 360 degree full image stream and the image stream of the VoI region having high resolution according to its own decoding capability, thereby providing the 360 degree broadcasting service spatially scaled.

In addition, when transmitting the 360 degree full image stream of the odd frame, the 360 degree full image stream of the even frame, the VoI image stream of the odd frame, and the VoI image stream of the even frame depending on the information of the user selection mode, the omni-directional 3D VR broadcasting server 40 selects the 360 degree full image stream of the odd frame, the 360 degree full image stream of the even frame, the VoI image stream of the odd frame, and the VoI image stream of the even frame according to its own performance, thereby providing the 360 degree broadcasting service temporally scaled.

In addition, when transmitting the left image stream and the right image stream for the 360 degree full image and the left image stream and the right image stream for the image of the VoI region depending on the information of the user selection mode, the omni-directional 3D VR broadcasting server 40 selects the left image stream and the right image stream for the 360 degree full image and the left image stream and the right image stream for the image of the VoI region depending its own 3D performance, thereby providing the 360 degree 3D broadcasting service.

At this time, the transmitting apparatus 510 can provide the 360 degree VR broadcasting service when the 360 degree VR image is used as the input source.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

The invention claimed is:

1. A method for providing a 360 degree virtual reality (VR) broadcasting service through a hybrid network from a transmitting apparatus, comprising:
transmitting a 360 degree full image stream having first resolution using an image acquired through a 3D VR camera;
receiving a user selection mode and movement information from a receiving apparatus; and
transmitting an image stream of a view of interest (VoI) region having second resolution different from the first resolution depending on the user selection mode and the movement information, wherein:
the transmitting of the 360 degree full image stream includes transmitting a left image stream and a right image stream for the 360 degree full image stream,
the transmitting of the image stream of the VoI region includes transmitting a left image stream and a right image stream for the image of the VoI region, and
one of the left image stream and the right image stream for the 360 degree full image stream is transmitted through a broadcast network and the other of the left image stream and the right image stream for the 360 degree full image stream and the left image stream and the right image stream for the image of the VoI region are transmitted through an Internet network.

2. The method of claim 1, wherein:
the transmitting of the image stream of the VoI region includes transmitting an image stream of some region continued to the VoI region on left and right, respectively, of the VoI region together with the image stream of the VoI region.

3. The method of claim 2, wherein:
the some region is a region in which encoding is independently performed and is formed to be smaller than the VoI region.

4. The method of claim 2, wherein:
the transmitting of the image stream of the some region together with the image stream of the VoI region includes:
transmitting the image stream of the VoI region through a base layer; and
transmitting the image stream of the some region through an enhancement layer.

5. The method of claim 1, wherein:
the 360 degree full image stream is transmitted through the broadcast network and the image stream of the VoI region is transmitted through the Internet network.

6. The method of claim 1, wherein:
the transmitting of the 360 degree full image stream includes segmenting the 360 degree full image stream into a 360 degree full image stream of an odd frame and a 360 degree full image stream of an even frame to transmit the 360 degree full image stream.

7. The method of claim 6, wherein:
the transmitting of the image stream of the VoI region includes segmenting the image stream of the VoI region into a VoI image stream of an odd frame and a VoI image stream of an even frame to transmit the image stream of the VoI region, and
one of the 360 degree full image stream of the odd frame and the 360 degree full image stream of the even frame is transmitted through the broadcast network and the other of the 360 degree full image stream of the odd frame and the 360 degree full image stream of the even frame and the VoI image stream of the odd frame and the VoI image stream of the even frame are transmitted through the Internet network.

8. An apparatus for providing a 360 degree virtual reality (VR) broadcasting service through a hybrid network, comprising:
an omni-directional 3D VR acquisition apparatus acquiring a plurality of source inputs for the 360 degree VR broadcasting service based on an image acquired through a 3D VR camera; and a broadcasting server selecting at least one of the plurality of source inputs depending on user selection information and transmitting the selected source input through the hybrid network and providing the 360 degree VR broadcasting service using at least one of spatial scalability, temporal scalability, and 3D scalability, wherein:

the broadcasting server selects a left image and a right image for the 360 degree full image as the source input for the 3D scalability or selects a left image and a right image for the 360 degree full image and a left image and a right image for the image of the VoI region as the source input, and one of the left image and the right image for the 360 degree full image is transmitted through a broadcast network and the other of the left image and the right image for the 360 degree full image and the left image and the right image for the image of the VoI region are transmitted through an Internet network.

9. The apparatus of claim 8, wherein:
the broadcasting server selects a 360 degree full image having first resolution and an image of a view of interest (VoI) region having second resolution higher than first resolution as a source input for the spatial scalability, and the image of the VoI region extracts the image of the VoI region depending on movement information of a user received from a receiving apparatus.

10. The apparatus of claim 9, wherein:
the broadcasting server transmits an image of some region continued to the VoI region on left and right, respectively, of the VoI region together with an image of the VoI region, and
the some region is a region in which encoding is independently performed.

11. The apparatus of claim 9, wherein:
the broadcasting server transmits the image of the VoI region through a base layer and transmits the image of the some region through an enhancement layer.

12. The apparatus of claim 8, wherein:
the broadcasting server segments the 360 degree full image into an image of an odd frame and an image of an even frame and selects the 360 degree full image of the odd frame and the 360 degree full image of the even frame for the temporal scalability.

13. The apparatus of claim 12, wherein:
the broadcasting server segments the image of the VoI region into a VoI image of an odd frame and a VoI image of an even frame and selects the 360 degree full image of the odd frame and the 360 degree full image of the even frame and the VoI image of the odd frame and the VoI image of the even frame as a source input for the temporal scalability, and
one of the 360 degree full image of the odd frame and the 360 degree full image of the even frame is transmitted through the broadcast network and the other of the 360 degree full image of the odd frame and the 360 degree full image of the even frame and the VoI image of the odd frame and the VoI image of the even frame are transmitted through the Internet network.

14. A method for providing a 360 degree virtual reality broadcasting service from a receiving apparatus, comprising:

receiving a 360 degree full image stream having first resolution through a hybrid network;
transmitting a user selection mode and movement information to a transmitting apparatus;
receiving an image of a view of interest (VoI) region having second resolution higher than the first resolution depending on the user selection mode and the movement information from the transmitting apparatus through the hybrid network; and
decoding a 360 degree full image stream having the first resolution and an image stream of the VoI region having the second resolution to provide a 360 degree virtual reality broadcasting service having the second resolution, wherein:
the receiving of the 360 degree full image stream includes receiving a 360 degree full image stream of an odd frame and a 360 degree full image stream of an even frame,
the receiving of the image stream of the VoI region includes receiving the image stream of the VoI region into a VoI image stream of an odd frame and a VoI image stream of an even frame, and
one of the 360 degree full image stream of the odd frame and the 360 degree full image stream of the even frame is received through a broadcast network and the other of the 360 degree full image stream of the odd frame and the 360 degree full image stream of the even frame and the VoI image stream of the odd frame and the VoI image stream of the even frame are received through an Internet network.

15. The method of claim 14, further comprising:
selectively receiving the 360 degree full image stream of the odd frame and the 360 degree full image stream of the even frame and the VoI image stream of the odd frame and the VoI image stream of the even frame to provide a 360 degree virtual reality broadcasting service of a frame rate in accordance with performance of the receiving apparatus.

16. The method of claim 14, wherein:
the receiving of the 360 degree full image stream includes receiving a left image stream and a right image stream for the 360 degree full image stream,
the receiving of the image stream of the VoI region includes receiving a left image stream and a right image stream for the image stream of the VoI region, and
one of the left image stream and the right image stream for the 360 degree full image stream is received through the broadcast network, and the other of the left image stream and the right image stream for the 360 degree full image stream and the left image stream and the right image stream for the image of the VoI region are received through the Internet network.

17. The method of claim 16, further comprising:
selectively receiving a left image stream and a right image stream for the 360 degree full image stream and a left image stream and a right image stream for the image stream of the VoI region to provide a 360 degree 3D virtual reality broadcasting service.

* * * * *